United States Patent [19]

Yamamoto et al.

[11] Patent Number: 5,341,231
[45] Date of Patent: Aug. 23, 1994

[54] LIQUID CRYSTAL DISPLAY DEVICE WITH EDGE LIT LIGHTGUIDE REFLECTING LIGHT TO BACK REFLECTOR BY TOTAL INTERNAL REFLECTION

[75] Inventors: Yoshitaka Yamamoto, Yamatokoriyama; Yutaka Ishii, Nara, both of Japan

[73] Assignee: Sharp Kabushiki Kaisha, Osaka, Japan

[21] Appl. No.: 984,937

[22] Filed: Dec. 3, 1992

[30] Foreign Application Priority Data

Dec. 3, 1991 [JP] Japan ................................ 3-318989
Dec. 3, 1991 [JP] Japan ................................ 3-318991

[51] Int. Cl.⁵ ...................... G02F 1/1335; F21V 7/04; F21V 5/00
[52] U.S. Cl. .......................................... 359/49; 359/69; 362/31; 362/328; 362/330
[58] Field of Search ............... 359/49, 69, 50; 362/31, 362/326, 328, 330

[56] References Cited

U.S. PATENT DOCUMENTS

| 4,011,001 | 3/1977 | Moriya ................... 359/49 |
| 4,626,074 | 12/1986 | Crossland et al. .......... 359/50 |
| 5,005,108 | 4/1991 | Pristash et al. ............ 362/31 |
| 5,050,946 | 9/1991 | Hathaway et al. ........... 359/50 |

FOREIGN PATENT DOCUMENTS

| 0308828 | 3/1989 | European Pat. Off. . |
| 2719808 | of 1977 | Fed. Rep. of Germany . |
| 3132660 | 3/1983 | Fed. Rep. of Germany . |
| 62-17730 | 1/1987 | Japan ................... 359/49 |

OTHER PUBLICATIONS

Patent Abstracts of Japan, vol. 15, No. 124 (M-1097) (Mar. 26, 1991), Abstract of JP 3-011502 (Jan. 18, 1991).
Patent Abstracts of Japan, vol. 15 No. 119 (P-1183) (Mar. 22, 1991), Abstract of JP 3-009306 (Jan. 17, 1991).

*Primary Examiner*—Anita P. Gross
*Attorney, Agent, or Firm*—David G. Conlin; George W. Neuner

[57] ABSTRACT

A reflective type liquid crystal display device excelling in uniformity and capable of making a bright display is presented. At the front side of the liquid crystal display element, that is, at the observer side, a light guide plate is disposed, and a pair of lamps are disposed at the outer side of the confronting side surfaces of the light guide plate. Collimators for limiting the incident angle θ to the upper surface of the light from the lamps are disposed between the light guide plate and lamps. That is, by the collimators, the incident angle θ to the upper surface is defined so that the incident light may be totally reflected, and that the reflected light may not be totally reflected by the lower surface 61b. As a result, the light from the lamps will not reach the observer directly, and a uniform illumination of the liquid crystal display element may be realized. Besides, at the observer side of the liquid crystal display element, a light guide plate forming protrusions is disposed, and a pair of lamps are disposed at the outer side of the confronting side surfaces of the light guide plate. Furthermore, between the light guide plate and lamps, collimators for limiting the incident angle θ of the light from the lamps into the upper surface are disposed. Accordingly, the light from the lamps does not reach the observer directly, and the light entering the protrusions formed on the light guide plate is emitted to the liquid crystal display element side. Thus, a uniform illumination into the liquid crystal display element is realized.

29 Claims, 12 Drawing Sheets

Fig.3(1) PriorArt
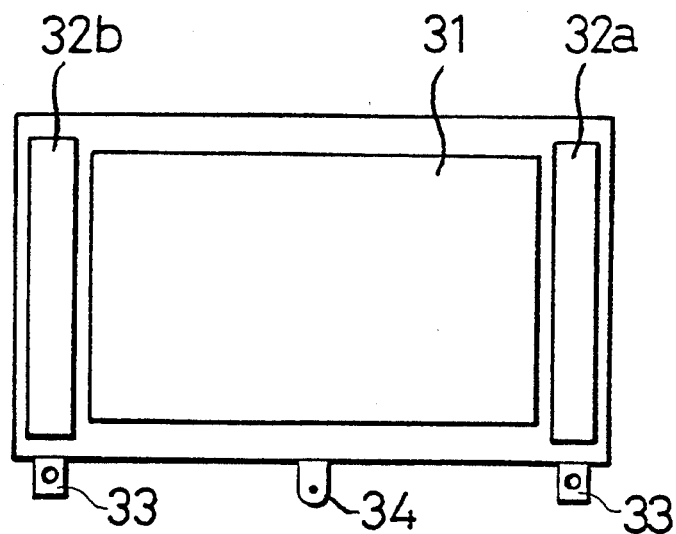
Fig.3(2) PriorArt
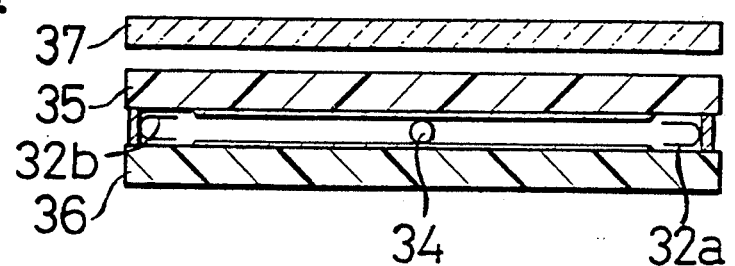

Fig.4
Prior Art
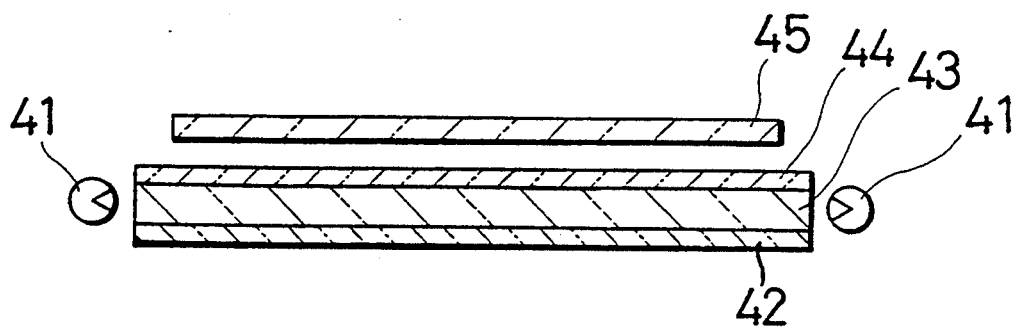
Fig.5
Prior Art
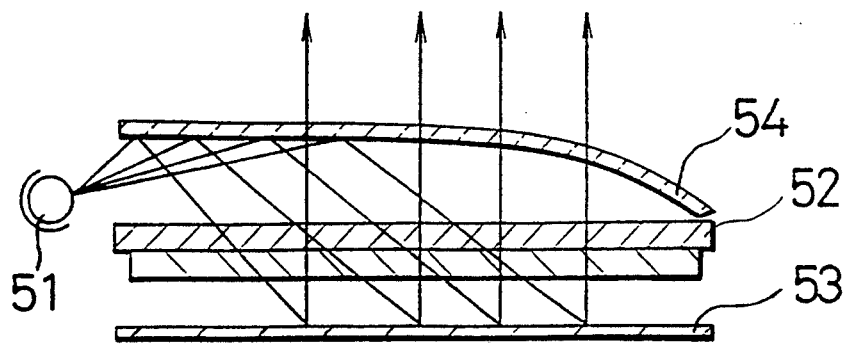

Fig.9(1)
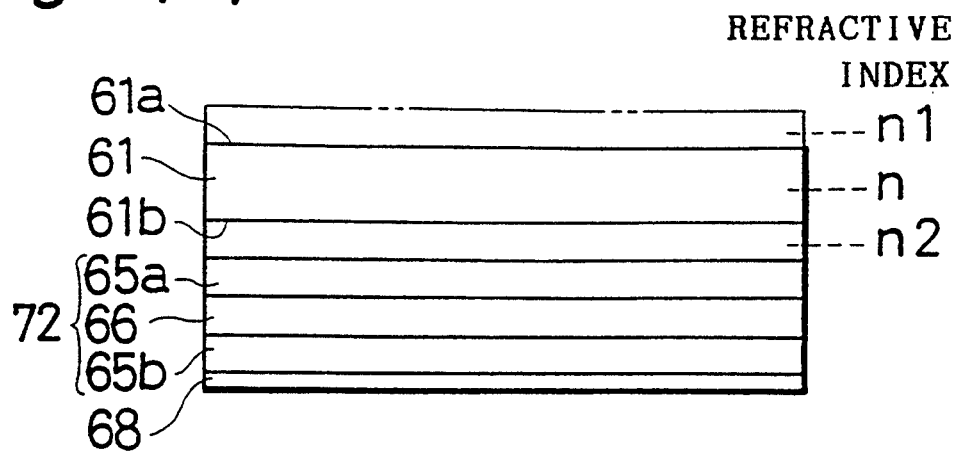
Fig.9(2)
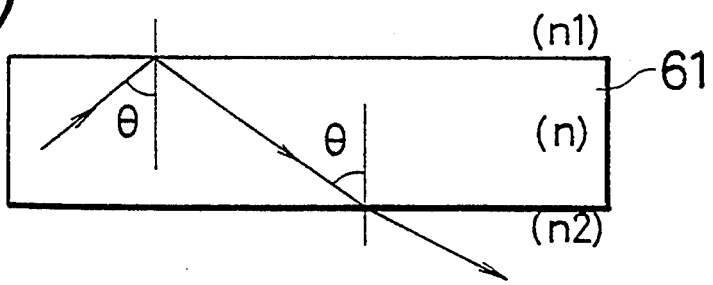
Fig.9 (3)
n ≈ n2
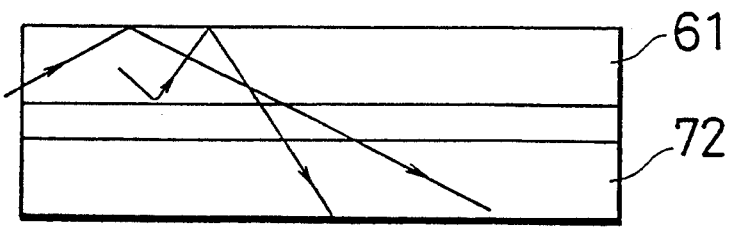
Fig.9 (4)
n < n2
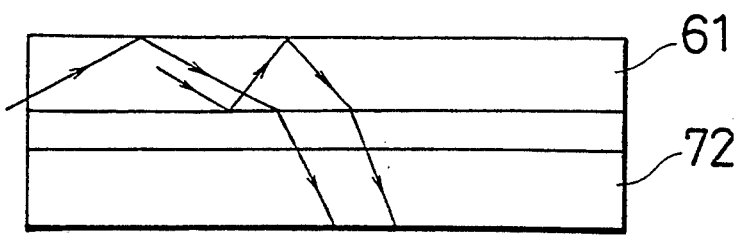

LIQUID CRYSTAL DISPLAY DEVICE WITH EDGE LIT LIGHTGUIDE REFLECTING LIGHT TO BACK REFLECTOR BY TOTAL INTERNAL REFLECTION

BACKGROUND OF THE INVENTION

1. Field of the Invention

The present invention relates to a so-called reflective type liquid crystal display device used in word processor, personal computer, other office automatic appliances, view finder of portable video tape recorder, and various monitors of video signals.

2. Description of the Related Art

The EL (electro-luminescence), CRT (cathode ray tube), and LED (light emitting diode) are display devices which emit light by themselves, while the liquid crystal is a display device which does not emit light by itself but receives light and exhibits a display. Therefore, it requires a light source in order that the display be visualized so as to be visible by the human eye. Hitherto, many structures have been proposed and realized for the light source device of direct-viewing type liquid crystal display devices. Principal examples are given below.

(a) Illumination lamp type

FIG. 1 is a sectional view showing a constituent example of a liquid crystal display device using a light source device of illumination lamp type. Lamps 11a, 11b are disposed on both sides of the front side of a liquid crystal display device 12. The light from the lamps 11a, 11b passes through the liquid crystal display device 12, and is reflected by a reflector 13, and is projected again to the liquid crystal display device 12 to be display light. In the case of the illumination lamp type, the lamps 11a, 11b as the light source may be installed at the front side of the display surface of the liquid crystal display device 12, and the number of parts is small, and a simple and inexpensive liquid crystal display device service is presented.

(b) Reflector mirror type

FIG. 2 is a diagram showing a constituent example of a liquid crystal display device using a light source of reflector mirror type. In the reflector mirror type, the light utilization efficiency is high, and a high luminance is obtained, and hence it is widely employed. On the opposite side of a liquid crystal display device 24 of a lamp 23, a reflector 22 is disposed, and the light from the lamp 23 is efficiently radiated to the front side (the liquid crystal display device 24 side). By the reflector 22 alone, the high luminance portion is deviated to the periphery of the lamp 23, and it tends to be uneven in luminance, and therefore a diffusion plate 21 is disposed in front of the lamp 23 and the luminance uniformity is improved by varying the thickness of the diffusion plate 21. The light from the diffusion plate 21 is projected to the liquid crystal display device 24.

(c) Flat plate lamp type

FIG. 3 is a diagram showing the constitution of a liquid crystal display device using a light source device of flat plate lamp type. A fluorescent compound is applied to the both inner surface of a front glass plate 35 and a rear glass plate 36, and a fluorescent plane 31 is formed. At both right and left ends of the fluorescent plane 31, discharge electrodes 32a, 32b are disposed, and by discharge between the discharge electrodes 32, 32b, the fluorescent plane 31 emits light. The light from the fluorescent plane 31 is projected to a liquid crystal display device 37. In this flat plate lamp type, the lamp itself is a flat plate, which may be disposed at the rear side of the liquid crystal display device 37, and the optical system is not necessary, so that the efficiency of utilization of light is high.

(d) Light guide plate type

FIG. 4 is a diagram for showing the constitution of a liquid crystal display device using a light source device of light guide plate type. The light radiated from a lamp 41 is guided by multiple reflection of the inner surface of a light guide plate 43 composed of acrylic resin excellent in light transmissivity. A reflector 42 is disposed on the opposite side surface of a liquid crystal display device 45 of the light guide plate 43, and the light from the lamp 41 is taken out through a diffusion plate 44 only from the front side, and is projected to the liquid crystal display device 45. Here, the lamp 41 focuses the light by making use of the reflector 42 and a slit not shown, and the utilization efficiency of light is improved, but since this light source device is not designed to make use of total reflection of the light guide plate 43 in its principle, the reflector 42 and the slit are not for limiting the incident angle of the light. This light source device is relatively thin, and is excellent in uniformity of luminance, so that it is applicable to thin design of electronic appliances utilizing portable liquid crystal display devices.

(e) EL type

The EL is a thin, lightweight, flat light source device, excellent in uniformity of luminance, possessing properties as the light source device for liquid crystal display device, but it is low in surface luminance, narrow in selection width of light color, and fast in color deterioration during use, and it has been replaced by the fluorescent lamp in the color trend of liquid crystal display device. Recently, however, the EL of high luminance and long life is being developed, and the EL lamp is being reviewed in the background of the thin design of liquid crystal display device.

(f) Transparent reflector type

FIG. 5 is a diagram showing the constitution of a liquid crystal device using a light source device of transparent reflector type. The light radiated from a lamp 51 is reflected by a front reflector 54 disposed at the front side (the observer 55 side) of a liquid crystal display device 52, and passes through the liquid crystal display device 52, and is reflected by a rear reflector 53, and passes through the liquid crystal display device 52 again and then the front reflector 54, and reaches the observer 55 looking at the liquid crystal display device 52. The liquid crystal display device making use of this light source device has not been realized yet.

Recently, the word processor, personal computer, and other office automation appliances are becoming small and portable progressively. In the portable appliance, considering the convenience of carrying, thin size and light weight are essential conditions, and the keyboard, display device and battery are rapidly becoming thinner in size and lighter in weight. On the other hand, reduction of power consumption is also important, and the reflection type liquid crystal display device shows the display that is visible only with external light in the sufficiently illuminated environments, and the display device without light source device is widely employed. In this type of liquid crystal display device, however, the display is hard to read when the ambient illumination becomes dark, which often causes troubles in use.

To solve these problems, what is needed is the reflective type liquid crystal display device with a light source device capable of illuminating the entire surface of the display device uniformly, being light in weight and thin in size. In the reflective type liquid crystal display device, since it is not possible to illuminate from the rear side, a transparent light source device must be disposed in front of the display surface. The reflective liquid crystal display device having a transparent prepositional light source device presents a display visible with external light only without using light source device built in the appliance as far as the ambient illumination is bright enough, and the light source device built in the appliance may be used when the ambient illumination is insufficient, and thus the light source device may be used only when required, so that the power consumption may be saved.

Of these six types of prior art above, in the (b) reflector mirror type, (c) flat plate lamp type, and (e) EL type, structurally, the light source device cannot be disposed before the liquid crystal display device. The (d) light guide plate type has the reflector, which cannot be place at the front because the light source is not transparent.

Both (a) illumination lamp type and (b) transparent reflector type can be both installed before the liquid crystal display device, but uniform illumination is difficult. In the (f) transparent reflector type, the light source device becomes large and thick. In addition, in the display mode using polarizer, such as TN-LC (twisted nematic liquid crystal) and STN-LC (super-twisted nematic LC), the liquid crystal molecules in the liquid crystal display element is twisted by 90 to 270 degrees as initial orientation, and the liquid crystal display elements are disposed between a pair of polarizers, end display is made by making use of the optical properties of the liquid crystal display elements, that is, the optical rotation characteristics without electric field and optical rotation cancellation characteristics in voltage applied state, but in the (a) illumination lamp type or (f) transparent reflector type, since the light source device must be disposed outside of the two polarizers, the light source light passes through each polarizer twice, or four times in total. Accordingly, the light absorption by the polarizer is large, and the utilization efficiency of light source light is lowered, and the display becomes dark.

SUMMARY OF THE INVENTION

It is hence a primary object of the invention to present a reflective type light crystal display device capable of presenting a bright display.

To solve the above object, the invention presents a liquid crystal display device comprising:

a liquid crystal display element composed of a transparent substrate, a counter substrate disposed oppositely to the transparent substrate and possessing reflecting means for reflecting the incident light entered from the transparent substrate side, and a liquid crystal layer interposed therebetween, a light guide plate disposed at the transparent substrate side of the liquid crystal display element, and a light source disposed at the side of the light guide plate, where in the condition of $$n1 < n \cdot \sin \theta < n2 \qquad (1)$$

may be satisfied supposing the refractive index of the light guide plate to be n, the refractive index of the substance positioned at the opposite side of the liquid crystal display element of the light guide plate to be n1, the refractive index of the substance positioned at the liquid crystal display element side of the light guide plate to be n2, and the incident angle of the light source light to the opposite side surface of the liquid crystal display element of the light guide plate to be $\theta$.

According to the invention, the reflecting means is disposed at the confronting substrate side disposed oppositely to the transparent substrate, and the display is made by controlling transmission/shielding of the light by using the liquid crystal display element reflecting the light coming in from the transparent substrate side. The liquid crystal display device of the invention has the light guide plate disposed at the transparent substrate side of the liquid crystal display element, while the light source is located at the outer side of the side surface of the light guide plate.

At this time, the incident angle $\theta$ of the light source light to the inner surface of the opposite side of the liquid crystal display element of the light guide plate is so set as to satisfy the relation of formula (1), that is, so as to reflect totally and that the reflected light may not be reflected totally on the inner surface of the liquid crystal element side of the light guide plate. Therefore, the light source light is not emitted to the observer side, and is entered in the liquid crystal display element. This incident light is reflected by the reflector, and only the light not conforming to the total reflection condition in the light guide plate, out of the display light passing through the liquid crystal display element passes through the light guide plate. That is, the light reaching the eye of the observer located at the specific distance from the transparent substrate of the display surface does not conform to the total reflection conditions usually, so that the display may be observed without problem. When the light source is turned off, the light guide plat is transparent, and the entrance of the external light from the transparent substrate side is not disturbed, so that the display by the external light is effected.

Thus, the light source device consisting of light guide plate and light source may be installed at the front side (display surface side) of the liquid crystal display element, and a uniform illumination is possible when the light source is being lit, and when the light source is turned off, the light guide plate is transparent, and the entrance of external light is not disturbed, so that a favorable display may be realized. Besides, the light source device is a thin and flat, and it can be installed between the polarizer and liquid crystal display element. In this case, as compared with the conventional liquid crystal display device installing the light source device outside the polarizer, the number of passings of the polarizer is smaller by one time, and therefore the light absorption by the polarizer decreases, thereby realizing a bright display.

Accordingly to the invention, the light guide plate and light source for composing the light source device may be installed at the front side of the liquid crystal display element, and the light from the light source does not directly get into the eye, while uniform illumination of the liquid crystal display element may be realized. As a result, it is possible to illuminate in the reflective type liquid crystal display device which was hard to illuminated conventionally. In addition, since the light guide plate is thin, it is suited to the portable office automation appliance mounting a reflective type liquid crystal display device. Moreover, the power consumption may be saved by lighting or putting out selectively as required, that is, putting out the light source when the surrounding condition is bright and it is enough to illuminate with external light alone, and turning on the light when the surrounding is dark. In this way, the reflective type liquid crystal display device of light weight, thin type and low power consumption may be realized.

The invention also presents a liquid crystal display device comprising:

a liquid crystal display element composed of a transparent substrate, a counter substrate disposed oppositely to the transparent substrate and possessing reflecting means for reflecting the incident light entered from the transparent substrate side, and a liquid crystal layer interposed therebetween, a light guide plate disposed at the transparent substrate side of the liquid crystal display element, and a light source disposed at the side of the light guide plate, wherein plural protrusions are formed on the surface of the light guide plate at the liquid crystal display element side, and the condition of $$n1 < n \cdot \sin \theta \quad (2)$$

is satisfied, supposing the refractive index of the light guide plate to be n, the refractive index of the substance positioned at the opposite side of the liquid crystal display element of the light guide plate to be n1, and the incident angle of the light source light to the opposite side surface of the liquid crystal display element of the light guide plate to be $\theta$.

According to the invention, the reflecting means is disposed at the counter substrate side disposed oppositely to the transparent substrate, and the display is effected by controlling the transmission/shielding of the light by using the liquid crystal display element reflecting the light entered from the transparent substrate side. The liquid crystal display device of the invention has the light guide plate disposed at the transparent substrate side of the liquid crystal display element, and the light source is located at the outer side of the side surface of the light guide plate.

At this time, the incident angle $\theta$ of the light source light to the inner surface at the opposite side of the liquid crystal display element of the light guide plate is set so as to satisfy the relation of formula (2), that is, to reflect totally. Of the reflected light, at least the light entering the protrusion portion is small in the incident angle than the light entering the surface other than the protrusion portion, and is hence emitted to the liquid crystal display element side. Therefore, the light source light is not emitted to the observer side, and is entered in the liquid crystal display element. This incident light is reflected by the reflector, and only the light not conforming to the total reflection condition in the light guide plate, out of the display light passing through the liquid crystal display element passes through the light guide plate. That is, the light reaching the eye of the observer located at a specific distance from the transparent substrate of the display surface does not conform to the total reflection conditions usually, so that the display may be observed without problem. When the light source is turned off, the light guide plat is transparent, and the entrance of the external light from the transparent substrate side is not disturbed, so that the display by the external light is effected.

Thus, the light source device consisting of light guide plate and light source may be installed at the front side (display surface side) of the liquid crystal display element, and a uniform illumination is possible when the light source is being lit, and when the light source is turned off, the light guide plate is transparent, and the entrance of external light is not disturbed, so that a favorable display may be realized. Besides, the light source device is a thin and flat, and it can be installed between the polarizer and liquid crystal display element. In this case, as compared with the conventional liquid crystal display device installing the light source device outside the polarizer, the number of passings of the polarizer is smaller by one time, and therefore the light absorption by the polarizer decreases, thereby realizing a bright display.

Accordingly to the invention, the light guide plate and light source for composing the light source device may be installed at the front side of the liquid crystal display element, and the light from the light source does not directly get into the eye, while uniform illumination of the liquid crystal display element may be realized. As a result, it is possible to illuminate in the reflective type liquid crystal display device which was hard to illuminated conventionally. In addition, since the light guide plate is thin, it is suited to the portable office automation appliance mounting a reflective type liquid crystal display device. Moreover, the power consumption may be saved by lighting or putting out selectively as required, that is, putting out the light source when the surrounding condition is bright and it is enough to illuminate with external light alone, and turning on the light when the surrounding is dark. In this way, the reflective type liquid crystal display device of light weight, thin type and low power consumption may be realized.

In the invention, the reflecting means has its reflection surface formed in a smooth undulated surface, and is disposed on the opposite side surface from the liquid crystal layer to the counter substrate.

In the invention, the reflecting means has its reflection surface formed in a smooth undulated surface, and is disposed on the liquid crystal layer side surface to the counter substrate.

In the invention, when disposing one polarizer, it is disposed at the front side of the light guide plate.

In the invention, an air layer with a refractive index n1 (satisfying n1 < n·sin $\theta$) is interposed between the polarizer and light guide plate.

In the invention, the surface of the front side of the light guide plate is coated with a material with a refractive index n1 (satisfying n1 < n·sin $\theta$), and the polarizer is directly disposed on its surface.

In the invention, the polarizer made of a material with a refractive index n1 (satisfying n1 < n·sin $\theta$) is directly disposed on the light guide plate.

In the invention, when disposing two polarizers, one polarizer is disposed at the front side of the light guide plate, and the other polarizer is disposed between the reflecting means located outside the counter substrate and the counter substrate.

In the invention, an air layer with a refractive index n1 (satisfying n1 < n·sin $\theta$) is interposed between one polarizer and the light guide plate.

In the invention, the surface of the front side of the light guide plate is coated with a material with a refractive index n1 (satisfying n1<n·sin θ), and one polarizer is directly disposed on its surface.

In the invention, one polarizer made of a material with a refractive index n1 (satisfying n1<n·sin θ) is directly disposed on the light guide plate.

In the invention, a diffusion plate is disposed at the front side of the reflecting means.

In the invention, a reflector for preventing light leak from the light guide plate is disposed at the side of the light guide plate not provided with the light source.

In the invention, the light source is lit when sufficient quantity of light is not obtained by the surrounding light alone.

In the invention, the protrusions are in a conical form.

In the invention, the protrusions are in a pyramidal form.

In the invention, the protrusions are in a truncated conical form.

In the invention, the protrusions are in a truncated pyramidal form.

In the invention, the sectional shape of the protrusions is nearly semicircular.

In the invention, the sectional shape of the protrusions is ellipsoidal.

In the invention, the sectional shape of the protrusions is parabolic.

In the invention, the sectional shape of the protrusions is arcuate.

In the invention, the protrusions are in an identical shape differing in size.

In the invention, the protrusions are in plural different shapes.

In the invention, the array density of the protrusions increases continuously or in steps, in proportion to the distance from the light source.

In the invention, the size of the protrusions increases, either continuously or in steps, in proportion to the distance from the light source.

In the invention, the protrusions are disposed in other regions than the pixels of the liquid crystal display element.

In the invention, the liquid crystal display element side surface of the light guide plate is coated with a film made of a light transmitted material of which refractive index is lower than that of the light guide plate, and the film thickness of the coating film is decreased, either continuously or in steps, in inverse proportion to the distance from the light source.

BRIEF DESCRIPTION OF THE DRAWINGS

Other and further objects, features, and advantages of the invention will be more explicit from the following detailed description taken with reference to the drawings wherein:

FIGS. 3(1) and 3(2) are diagrams showing a constitutional example of a liquid crystal display device by flat plate lamp type.

FIG. 4 is a sectional view showing a constitutional example of a liquid crystal display device by light guide plate type.

FIG. 5 is a sectional view showing a constitutional example of a liquid crystal display device by transparent reflector type.

FIGS. 9(1), 9(2), 9(3), and 9(4) are diagrams for explaining the principle of the invention.

DETAILED DESCRIPTION OF THE PREFERRED EMBODIMENTS

Figure 1:
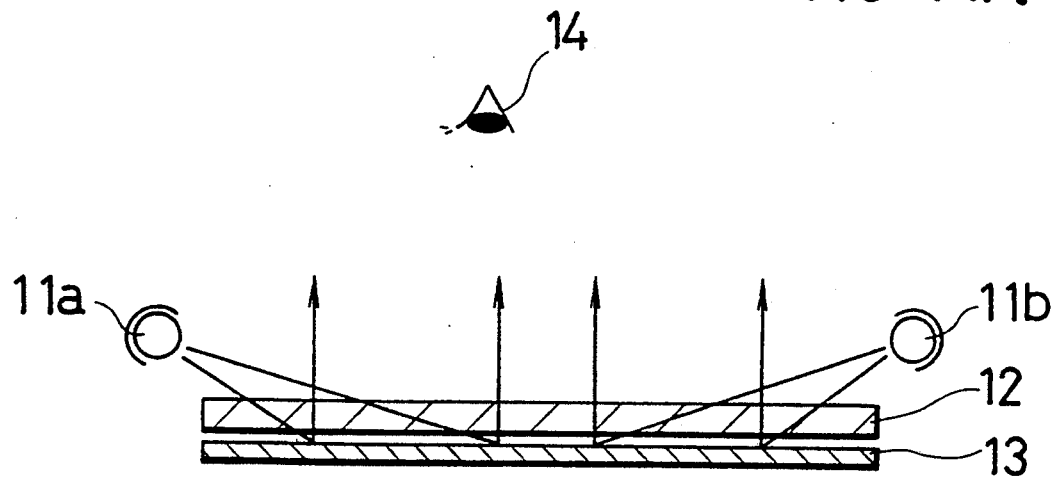
FIG. 1 is a sectional view showing a constitutional example of a liquid crystal display device by illumination lamp type.
Figure 2:
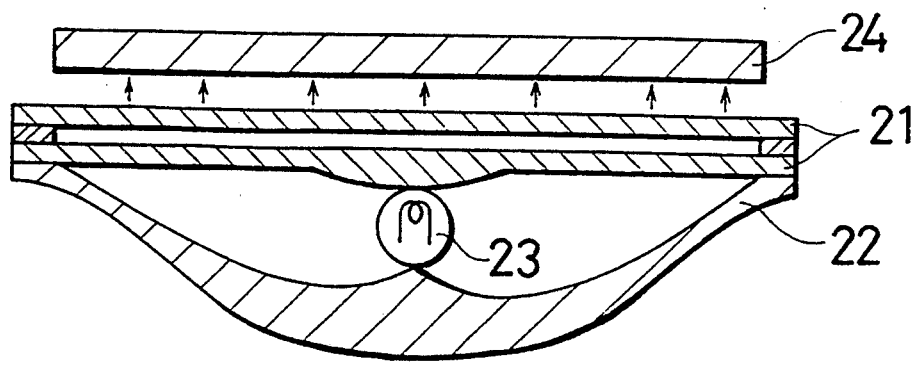
FIG. 2 is a sectional view showing a constitutional example of a liquid crystal display device by reflector mirror type.

Now referring to the drawing, preferred embodiments of the invention are described below.

Figure 6:
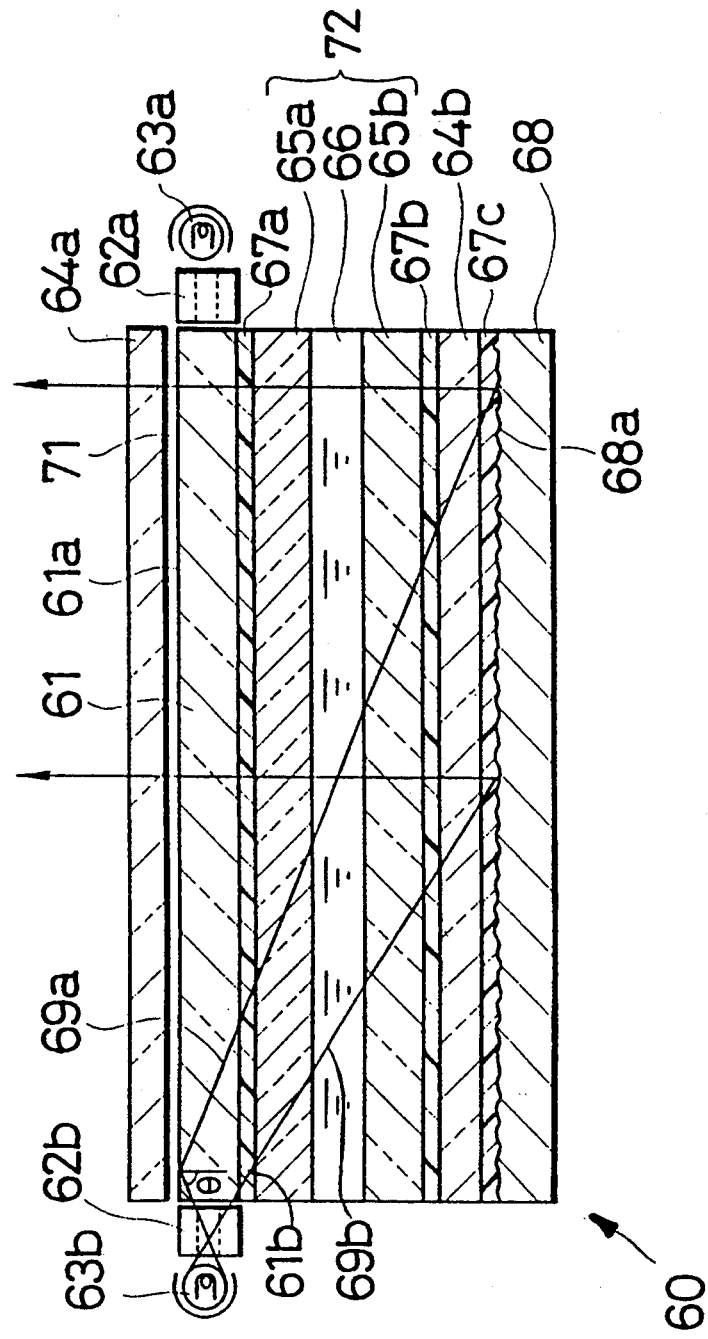
FIG. 6 is a sectional view showing the structure of a liquid crystal display device 60 in a first embodiment of the invention.

FIG. 6 is a sectional view showing the structure of a liquid crystal display device 60 in a first embodiment of the invention. The liquid crystal display device 60 is composed by disposing a liquid crystal display element 72 between a pair of polarizers 64a, 64b. The liquid crystal display element 72 is composed by interposing a liquid crystal layer 66 between a pair of transparent substrate 65a, 65b made of glass or the like. In this embodiment, the liquid crystal display element 72 is a liquid crystal display device of TFT (thin film transistor) type as described later. Therefore, the TFT type is explained in the embodiment, but the invention is not limited to it alone, but may be realized in other methods, such as MIM (metal insulator metal) method and passive-matrix method.

On the opposite side of the liquid crystal display element 72 of the polarizer 64b, a reflector 68 is disposed. The surface of the liquid crystal display element 72 side of the reflector 68 is undulated so as to reflect uniformly the incident light from the liquid crystal display element 72 side.

Between the liquid crystal display element 72 and polarizer 64a, a light guide plate 61 is disposed through an air layer 71 against the polarizer 64a. At the outer side of the confronting side surface of the light guide plate 61, lamps 63a, 63b are disposed. Between the light guide plate 61 and lamps 63a, 63b, collimators 62a, 62b are disposed. The collimators 62a, 62b limit the incident angle of the light from the lamps 63a, 63b to the upper surface 61a of the light guide plate 61. The light guide plate 61 and transparent substrate 65a, transparent substrate 65b and polarizer 64b, and polarizer 64b and reflector 68 are respectively adhered with each other by means of transparent adhesives 67a, 67b, 67c. Or, the leak of light may be prevented by disposing a reflector at the side surface where the lamps 63a, 63b of the light guide plate 61 are not disposed.

Here, the materials of the light guide plate 61, glass substrate 65a, liquid crystal layer 66, transparent substrate 65b, polarizer 64b, and transparent adhesives 67a, 67b, 67c are selected so that the refractive index may be nearly equal.

To limit the incident angle of the incident light from the lamps 63a, 63b to the guide light plate 61, the collimators 62a, 62b are used, but other method may be also employed as far as the incident angle may be limited in a specific range. For example, the incident light may be limited by providing slits in the lamps 63a, 63b, or in the area near the lamps 63a, 63b, the incident angle to the light guide plate 61 is small, and total reflection does not occur, and therefore the light source light leaks directly from the surface of the light guide plate 61 to outside, and this portion may be shielded. By setting the refractive index of the light guide plate 61 at a proper value, all light entering the light guide plate 61 may satisfy the total reflection condition. In such a case, the collimators may be omitted.

Or, depending on the necessity, either one or both of the surfaces 61a, 61b of the light guide plate 61 may be coated with anti-reflection film, total reflection inducing coating, or coating for preventing scratches or repairing scratches.

If, moreover, the reflector 68, transparent substrate 65b, or light guide plate 61 and transparent substrate 65a may be fixed by other means than transparent adhesives, silicone oil or other filler may be used instead of the transparent adhesive.

In the embodiment, the light guide plate 61 is adhered on the transparent substrate 65a by using transparent adhesive 67a, but the light guide plate 61 may be used as the transparent substrate 65a. That is, in this case, the transparent substrate 65a and transparent adhesive 67a may be omitted.

Furthermore, the surface of the upper surface 61a of the light guide plate 61 may be coated with a material smaller in the refractive index than the light guide plate material. In this case, supposing the refractive index of the coating agent to be n1, the refractive index of the light guide plate 61 to be n, and the incident angle of the light 69a to the light guide plate 61 to be θ, as far as the relation of $$\sin \theta > n1/n \tag{3}$$

is satisfied, the light entering the light guide plate 61 is totally reflected between the light guide plate 61 and the coating agent, so that the polarizer 64a may be directly adhered to the light guide plate 61. Furthermore, by setting the refractive index of the light guide plate 61 and the polarizer 64a at a proper value, the polarizer 64a may be directly adhered to the light guide plate 61.

Figure 7:
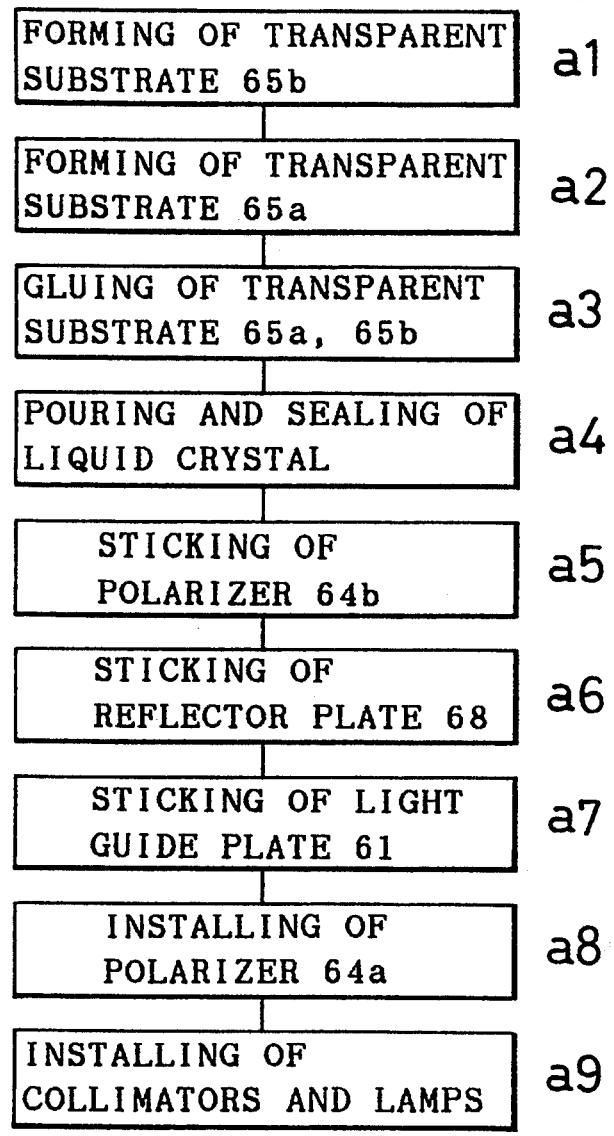
FIG. 7 is a process chart for explaining the manufacturing method of the liquid crystal display device 60.

FIG. 7 is a process chart for explaining the manufacturing method of the liquid crystal display device 60. At process a1, the transparent substrate 65b is formed by using borosilicate glass, and an amorphous silicon TFT (thin film transistor) is formed on one surface of this transparent substrate 65b in a general procedure, and a pixel electrode is formed in a matrix. On the surface, a resin such as polyimide is applied, and an alignment film is formed by rubbing process. At process a2, using borosilicate glass or the like, the transparent substrate 65a is formed, and a transparent electrode (ITO: indium tin oxide) as a common electrode and an alignment film are formed on one surface thereof.

At process a3, disposing the transparent electrodes 65a, 65b so that the electrode forming surfaces may confront, and a spacer is interposed between the substrates to glue together. At process a4, a TN (twisted nematic) liquid crystal is poured to seal between the transparent substrates 65a, 65b. Here, the liquid crystal was ZLI-1565 manufactured by Merck, but other liquid crystal material may be used. For example, by using a polymer dispersion type liquid crystal which is the liquid crystal material manufactured by compounding organic polymer and liquid crystal compound, the polarizer is not needed, so that the utilization efficiency of the light is enhanced. Besides, using the guest-host type liquid crystal material, display is possible by using only one polarizer. More specifically, among the guest-host type, in particular, when the liquid crystal material of White Taylor type is used, the polarizer is not needed, same as in the case of the liquid crystal material of compounding the organic polymer and liquid crystal compound. On the other hand, aside from the materials shown in the embodiment, many other materials are known as the TN liquid crystal material, and other materials may be also used.

Afterwards, at process a5, the polarizer 64b is sticked to the transparent substrate 65b with an epoxy transparent adhesive 67b. In succession, at process a6, an Al (aluminum) reflector plate 68 with hair line processing is adhered to the polarizer 64b with an epoxy transparent adhesive 67c. Afterwards, at process a7, borosilicate glass of about 2.5 mm in plate thickness is adhered on the transparent substrate 65a with a transparent adhesive 67a to obtain the light guide plate 61.

In this embodiment, an example of adhering the Al reflector plate 68 to the polarizer 64b is shown, but it is not limitative. For example, by using the ECB (electrically controlled birefringence) type LC, guest-host type LC, guest-host LC of White Taylor type, polymer dispersion type LC, etc., the polarizer 64b out of the pair of polarizers 64a, 64b may be omitted, and hence the reflector plate may be directly formed on the glass substrate 65b. In this case, the reflector plate may be formed on the surface of the liquid crystal layer side, or on the opposite side surface of the liquid crystal layer.

Successively, at process a8, a polarizer 64a was installed at a gap of about 1 mm against the upper surface 61a of the light guide plate 61. Fixing them to the frame not shown, at process a9, the collimators 62a, 62b, and the lamps 63a, 63b were installed.

Figure 8:
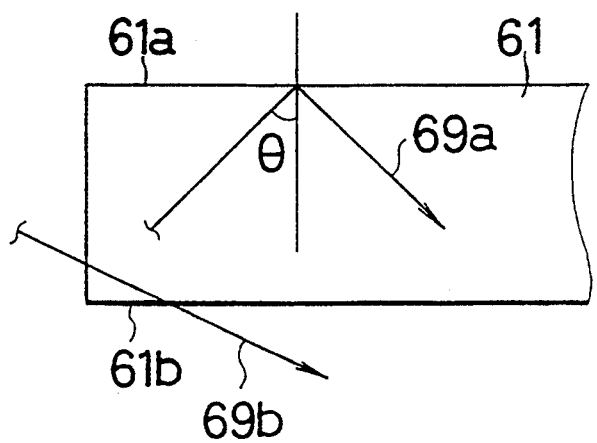
FIG. 8 is a diagram for explaining the operating principle of a light guide plate 61 provided in the liquid crystal display device 60.

FIG. 8 is a drawing for explaining the operation of the light guide plate 61. The light entering the light guide plate 61 from the lamps 63a, 63b consists of the light 69a reflected by the upper surface 61a of the light guide plate 61, and the light 69b entering in the direction of the reflector plate 68 directly. Here, supposing the refractive index of the light guide plate 61 to be n, when the incident satisfies the condition of $$\sin \theta > 1/n \tag{4}$$

the light 69a is totally reflected by the upper surface 61a of the light guide plate 61, and enters in the direction of the reflector plate 68. In this embodiment, since glass is used as the light guide plate 61, n is about 1.5, and therefore the incident angle θ is 42 degrees or more. In this embodiment, a glass plate is used as the light guide plate, but other material than glass may be also used as far as the light can be guided uniformly without deterioration and the refractive index is proper. For example, PMMA (polymethylmethacrylate), CR-39 resin, polycarbonate, polyvinyl chloride, polyester, or other materials may be used.

On the other hand, the light 69b advancing directly in the direction of the reflector plate 68 runs forward without being affected by reflection or refraction because the refractive index of the material through which the light passes is nearly equal to the refractive index of the light guide plate 61. The light reaching the reflection surface 68a of the reflector plate 68 is scattered by the reflection surface 68a, and is made uniform. Afterwards, passing sequentially the adhesive 67c, polarizer 64b, adhesive 67b, transparent substrate 66b, liquid crystal layer 66, transparent substrate 65a, adhesive 67a, light guide plate 61, air layer 71, and polarizer 64a, it reaches the observer 70. At this time, in order to enhance the uniformity of light, a diffusion plate may be placed between the reflector plate 68 and the polarizer 64b.

Besides, in order to make uniform the light emitted from the light guide plate 61 in the direction of reflector plate 68, the light guide plate 61 may be processed. For example, by coating the lower surface 61b of the light guide plate 61 with a film low in refractive index and partially removing by etching, the quantity of light taken out from the light guide plate 61 may be controlled. That is, in order that the illumination may be uniform on the entire surface of the display device, the coating film is formed densely near the lamps 63a, 63b, and sparsely at a place remote from the lamps by forming the pattern, so that the quantity of light may be made uniform within the light guide plate.

The quantity of light may be also made uniform by varying the film thickness of the coating film. If the coating film is thin, the light leaks through the film, and therefore the output light may be made uniform by increasing the coating film thickness, for example, near the lamps 63a, 63b, and decreasing the coating film thickness as departing from the lamps 63a, 63b.

FIG. 9 is a diagram for explaining the principle of the invention. As shown in FIG. 9 (1), the refractive index of the substance contacting with the upper surface 61a of the light guide plate 61 is supposed to be n1, the refractive index of the light guide plate 61 to be n, and the refractive index of the substance contacting with the lower surface 61b of the light guide plate 61 to be n2. As shown in FIG. 9 (2), supposing the incident angle of the light entering the light guide plate 61 into the upper surface 61a and lower surface 61b to be θ, the condition of total reflection by the upper surface 61a is $$n \cdot \sin \theta > n1 \quad (5)$$

Similarly, the condition of not totally reflecting by the lower surface 61b is $$n \cdot \sin \theta < n2 \quad (6)$$

Therefore, the condition of total reflection by the upper surface 61a and not making total reflection by the lower surface 61b is, from formula (5) and formula (6), as follows:

$$n1 < n \cdot \sin \theta < n2 \quad (7)$$

That is, $$\sin^{-1}(n1/n) < \theta < \sin^{-1}(n2/n) \quad (8)$$

Here the greater the refractive index n2/n and the smaller n1/n, the wider becomes the range of θ, and the quantity of light that can be taken out increases. Besides, when n=nearly n2, then n2/n=nearly 1, and almost all light of total reflection by the upper surface 61a is emitted from the lower surface 61b, and when the refractive index of the lower structures such as the liquid crystal display element 72 is all equal to n, the light is not refracted, but runs straightly forward.

Furthermore, when n<n2 and the refractive index of the lower structures such as the liquid crystal display element 72 is all n2, as shown in FIG. 9 (4). the light is refracted by the lower surface 61b, but runs straight afterwards.

Thus, according to the embodiment, the light guide plate 61, collimators 62a, 62b, and lamps 63a, 63b for composing the light source device may be disposed at the front side (the observer 70 side) of the liquid crystal display element 72. Accordingly, in the reflective type liquid crystal display device, if the surrounding is dark, by lighting the light source, the light necessary for display is given to the liquid crystal display device 72, so that a visible display is realized. When the surrounding is bright, by putting out the light source, the light guide plate 61 becomes transparent, and a sufficiently visible display is realized with the external light alone. Thus, by operating the light source device only when necessary, the power consumption may be saved. In addition, the light guide plate 61 may be disposed between the polarizer 64a and the liquid crystal display element 72, and the number of passings of the light through the polarizer is decreased by one time, and a brighter display is realized as compared with the case of disposing the light guide plate 61 outside of the polarizer 64a.

In the embodiment, two confronting lamps 63a, 63b are used, but one lamp may be enough as far as a sufficient quantity of light may be obtained.

Comparing further with the prior art of (a) illumination lamp type, the display excellent in uniformity is obtained. Or in comparison with the prior art of (f) transparent reflection plate type, the thin and lightweight display with excellent luminance and uniformity is obtained.

Figure 10:
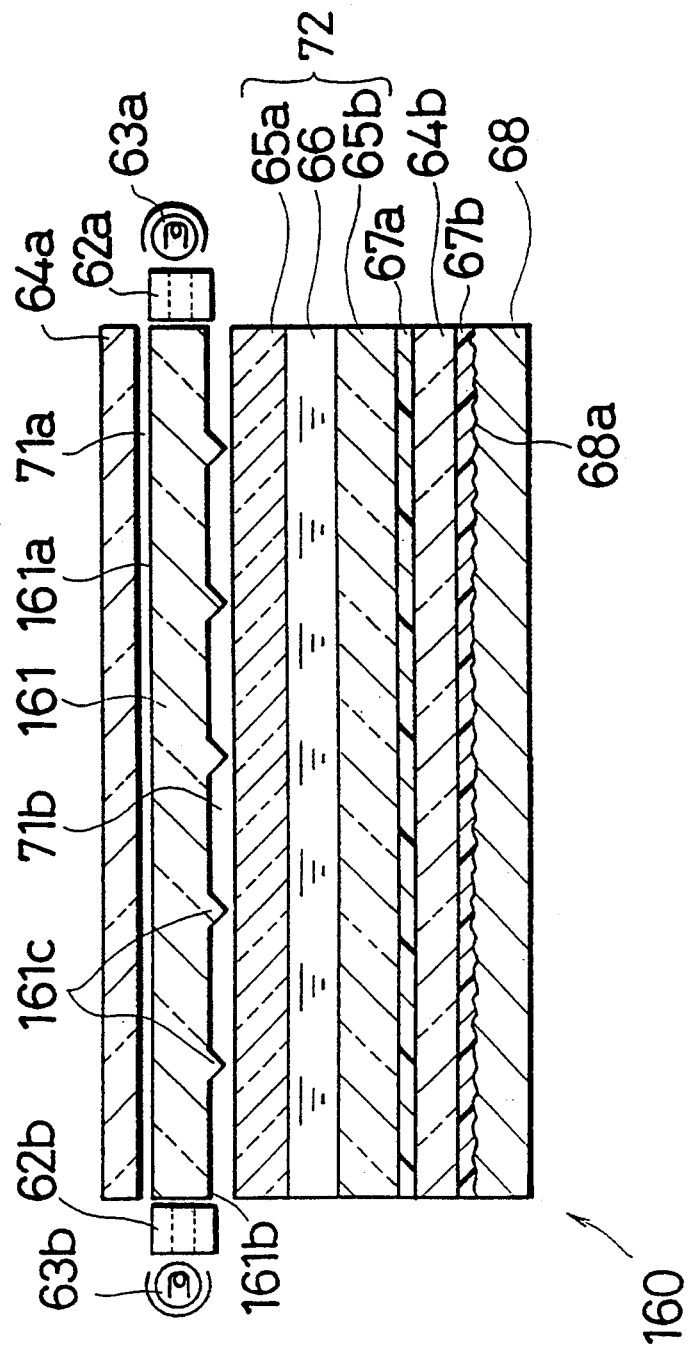
FIG. 10 is a sectional view showing the structure of a liquid crystal display device 160 is a second embodiment of the invention.

FIG. 10 is a sectional diagram showing the structure of a liquid crystal display device 160 as a second embodiment of the invention. The liquid crystal display device 160 is composed by interposing a liquid crystal display element 72 between a pair of polarizers 64a, 64b. The liquid crystal display element 72 is composed by interposing a liquid crystal layer 66 between a pair of transparent substrates 65a, 65b made of glass or the like. In this embodiment, as described below, the liquid crystal display element 72 is a liquid crystal display element of TFT (thin film transistor) type. The embodiment refers to the example of TFT type, but it is not limitative, and other methods may be also applied, including MIM (metal insulator metal) method and passive-matrix method.

On the opposite side of the liquid crystal display element 72 of the polarizer 64b, a reflector plate 68 is disposed. The liquid crystal display element 72 side surface of the reflector plate 68, undulations are formed to reflect uniformly the incident light from the liquid crystal display element 72 side.

Between the liquid crystal display element 72 and polarizer 64a, a light guide plate 161 is disposed through air layers 71a, 71b against the polarizer 64a, and liquid crystal display element 72. On the liquid crystal display element 72 side of the light guide plate 161, plural protrusions 161c are formed.

At the outer side of the confronting side surface of the light guide plate 161, lamps 63a, 63b are disposed. Collimators 62a, 62b are disposed between the light guide plate 161 and lamps 63a, 63b. The collimators 62a, 62b limit the incident angle of the light from the lamps 63a, 63b to the upper surface 161a of the light guide plate 161. Or, at the side not provided with the lamps 63a, 63b of the light guide plate 161, a reflector plate may be disposed to prevent leak of light.

The transparent substrate 65a and polarizer 64b, and the polarizer 64b and reflector plate 68 are respectively adhered with transparent adhesives 67a, 67b.

The materials of the transparent substrate 65, liquid crystal layer 66, transparent substrate 65b, polarizer 64b, and transparent adhesives 67a, 67b were selected so that the refractive index may be nearly equal.

Here, the collimators 62a, 62b are used for limiting the incident angle of the incident light from the lamps 63a, 63b to the light guide plate 161, but other means may be employed as far as the incident angle may be limited within a specific range. For example, the incident angle may be defined by forming slits in the lamps 63a, 63b, or since the incident angle to the light guide plate 161 is small in the area near the lamps 63a, 63b, and total reflection does not occur, and therefore the light of the light source directly escapes outside from the surface of the light guide plate 161, and hence this area may be shielded. Besides, by setting the refractive index n of the light guide plate 161 to a proper value, all light entering the light guide plate 161 may satisfy the conditions of total reflection. In this case, the collimators may be omitted.

As required, moreover, either one or both of the surfaces 161a, 161b of the light guide plate 161 may be coated with an anti-reflection film, coating for inducing total reflection, or coating for preventing scratches or repairing scratches.

Besides, if the reflector plate 68 and transparent substrate 65b may be fixed by other means than the transparent adhesive, the gaps may be filled with other filler such as silicone oil, instead of transparent adhesives.

Furthermore, the upper surface 161a of the light guide plate 161 may be coated with a material having a smaller refractive index than the light guide plate material. In this case, the polarizer 64a may be directly adhered onto the light guide 161. Or, by setting the refractive index of the light guide plate 161 and polarizer 64a to a proper value, the polarizer 64a may be directly adhered onto the light guide plate 161. Or, the lower surface 161b of the light guide plate 161 may be coated with a material having a larger refractive index than the light guide plate material. Or, if there is no trouble in taking out the light from the lower surface 161b of the light guide plate 161, the lower surface 161b may be coated, or a transparent adhesive having a proper refractive index may be used to adhere to the glass substrate 65a.

In the embodiment, the liquid crystal display device using the polarizers is mentioned, but the invention may be also realized in a liquid crystal display device of polymer dispersion type not using polarizer. In this case, in FIG. 10, the polarizers 64a, 64b and adhesive 67a may be omitted.

Figure 11:
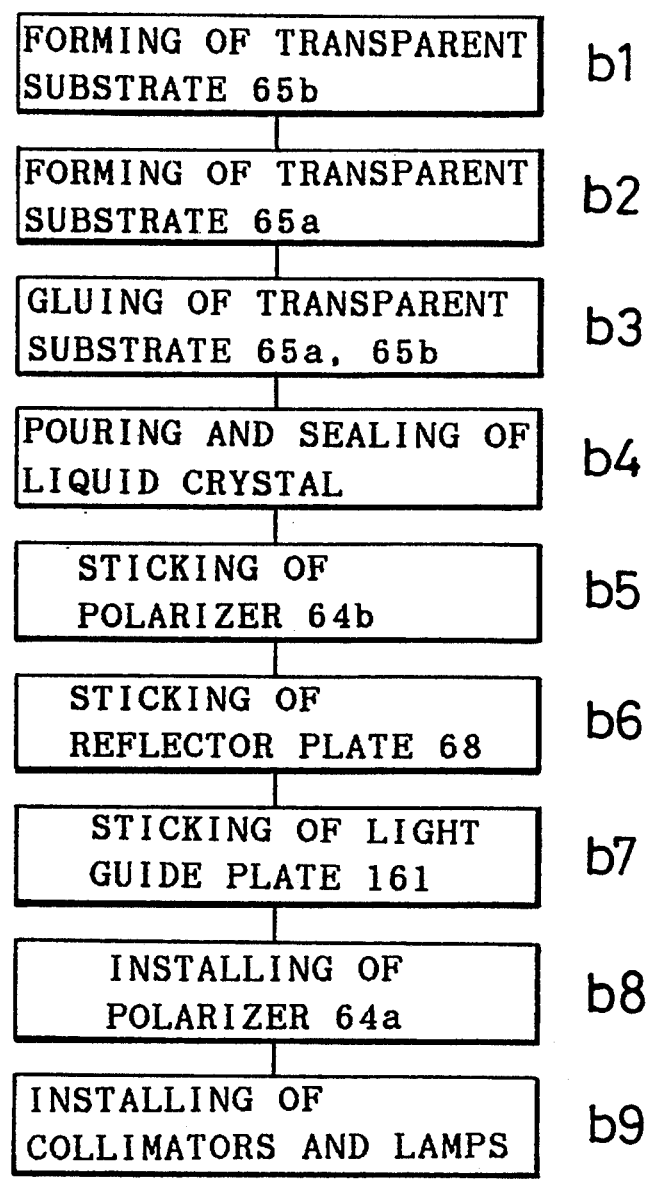
FIG. 11 is a process chart for explaining the manufacturing method of the liquid crystal display device 160.

FIG. 11 shows a process chart for explaining the manufacturing process of the liquid crystal display device 160. At process b1, a transparent substrate 65b is formed by using borosilicate glass, and an amorphous silicon TFT is formed on one surface of the transparent substrate 65b in a general procedure, and pixel electrodes are formed in a matrix. On the surface, a resin such as polyimide is applied, and an alignment film is formed by rubbing process. At process b2, a transparent substrate 65a is formed by using borosilicate glass or the like, and a transparent electrode (ITO: indium tin oxide) as a common electrode and an alignment film are formed on one surface thereof.

At process b3, the transparent substrates 65a, 65b are disposed so that the electrode forming surfaces may confront, and are glued together by inserting a spacer between the substrates. At process b4, the space between the transparent substrates 65a, 65b is sealed with NT (twisted nematic) liquid crystal. Here, the liquid crystal of ZLI-1565 manufactured by Merck was used, but other liquid crystal materials may be used. For example, when the polymer dispersion type liquid crystal which is a compounding liquid crystal material of organic polymer and liquid crystal compound, the polarizer is not necessary, and the light utilization efficiency is enhanced. Using the liquid crystal material of guest-host type, it is possible to display with one polarizer alone. In particular, among the guest-host type materials, when the White Taylor type liquid crystal material is used, the polarizer plate is not needed same as in the case of using the compounding liquid crystal material of organic polymer and liquid crystal compound. On the other hand, as the TN liquid crystal material, many materials are known aside from those disclosed in the embodiment, and other materials may be used.

Afterwards, at process b5, the polarizer 64b is adhered to the transparent substrate 65b with an epoxy transparent adhesive 67a. Consequently, at process b6, the hairline-processed A1 reflector plate 68 is adhered to the polarizer 64b with an epoxy transparent adhesive 67b. Then, at process b7, a light guide plate 161 made of PMMA (polymethyl methacrylate) with a plate thickness of about 2.5 mm forming conical protrusions of about 20 μm in diameter and about 12 μm in height on one surface was fixed at a proper position lighting contacting with the upper substrate 65a.

This embodiment relates to an example of adhesing the A1 reflector plate 68 to the polarizer 64b, but it is not limitative. For example, by using the ECB (electrically controlled birefringence) type LC, guest-host type LC, White Taylor type guest-host LC, and polymer dispersion type LC, one polarizer 64b of the pair of polarizers 64a, 64b can be omitted, and therefore the reflector plate may be directly formed on the glass substrate 65b. In this case, the reflector plate may be formed on the liquid crystal layer side surface, or formed on the opposite side surface of the liquid crystal layer.

In succession, at process b8, the polarizer 64a was installed at a gap of about 1 mm to the upper surface 161a of the light guide plate 161. After fixing them to the frame not shown, at process b9, collimators 62a, 62b, and lamps 63a, 63b were installed.

Figure 12:
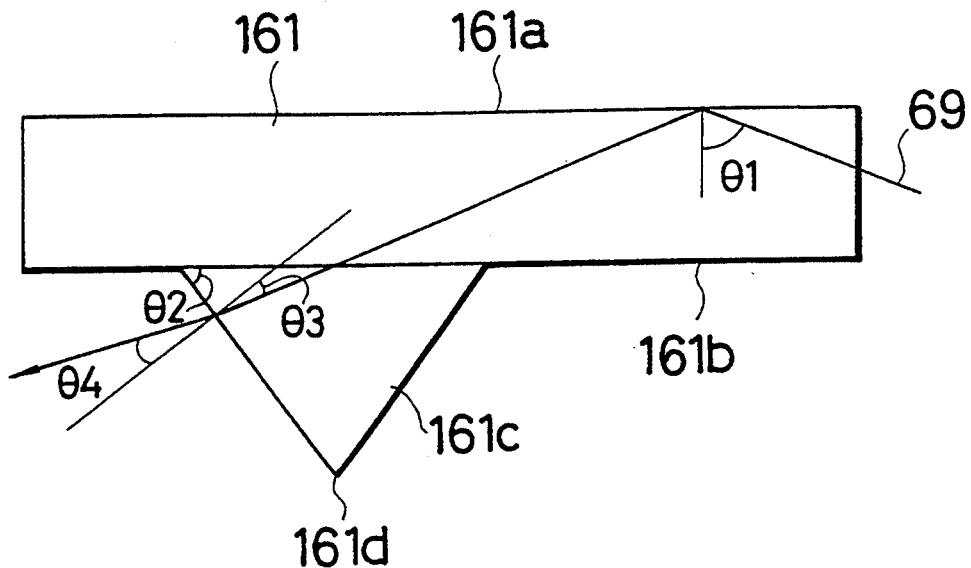
FIG. 12 is a diagram for explaining the operating principle of a light guide plate 161 provided in the liquid crystal display device 160.

FIG. 12 is a diagram for explaining the principle of operation of the light guide plate 161. When the light 69 entering the light guide plate 161 from the lamps 63a, 63b satisfies the condition of $$\sin \theta 1 > 1/n \qquad (9)$$

supposing the incident angle to the upper surface 161a of the light guide plate 161 to be $\theta 1$ and the refractive index of the light guide plate 161 to be n, the incident light 69 propagates inside the light guide plate 161 while repeating reflections on the upper surface 161a and lower surface 161b of the light guide plate 161. At this time, when the light enters the protrusions 161c formed on the lower surface 161b of the light guide plate 161, the incident angle $\theta 3$ to the surface of the protrusions 161c is $$\theta 3 = \theta 1 - \theta 2 \qquad (10)$$

Here, when the incident angle $\theta 3$ satisfies the condition of $$\sin \theta 3 < 1/n \qquad (11)$$

the light 69 is not totally reflected on the surface of the protrusions 161c of the light guide plate 161, but is emitted outside of the light guide plate 161. At this time, when the exit angle $\theta 4$ satisfies the condition of $$\theta 4 > 90° - \theta 2 \qquad (12)$$

the exit light enters again the light guide plate 161 from the lower surface 161b, and leaves from the upper surface 161a.

To prevent this, the incident angle $\theta 1$ is limited so as to satisfy the condition of $$\theta 1 < \theta 2 + \sin^{-1}(\sin (90° - \theta 2)/n) \qquad (13)$$

In this embodiment, since PMMA is used as the material for the light guide plate 161, the refractive index n is about 1.5. Hence, when $$\theta 1 > 42° \qquad (14)$$

the illumination light 69 is totally reflected on the upper surface 161a of the light guide plate 161.

On the other hand, the condition for not inducing total reflection of the illumination light 69 on the surface of the protrusions 161c is as follows.

$$\theta 2 > 48° \qquad (15)$$

The condition of the light once leaving that should not enter again is $$\theta 1 < 74.5° \qquad (16)$$

In this embodiment, the collimators 62a, 62b are set in the condition of $$45° < \theta 1 < 70° \qquad (17)$$

and defining $\theta 2 = 50°$ in consideration of processing precision of the light guide plate 161, assembling condition of illumination device, and precision of collimator, as a result, there was no leak of the light in the direction of the upper surface 161a of the light guide plate 161, and it was confirmed that the illumination light was emitted only to the lower surface 162b, and hence a favorable display characteristic was obtained by installing on the liquid crystal display element 72.

Meanwhile, the illumination light 69 propagating through the light guide plate 161 does not enter the front end portion of the protrusions 161 formed in a conical or pyramidal form, and hence the front end portion of the protrusions 161c may be formed flatly. At this time, the protrusions 161c are in a truncated conical or pyramidal form.

Figure 13:
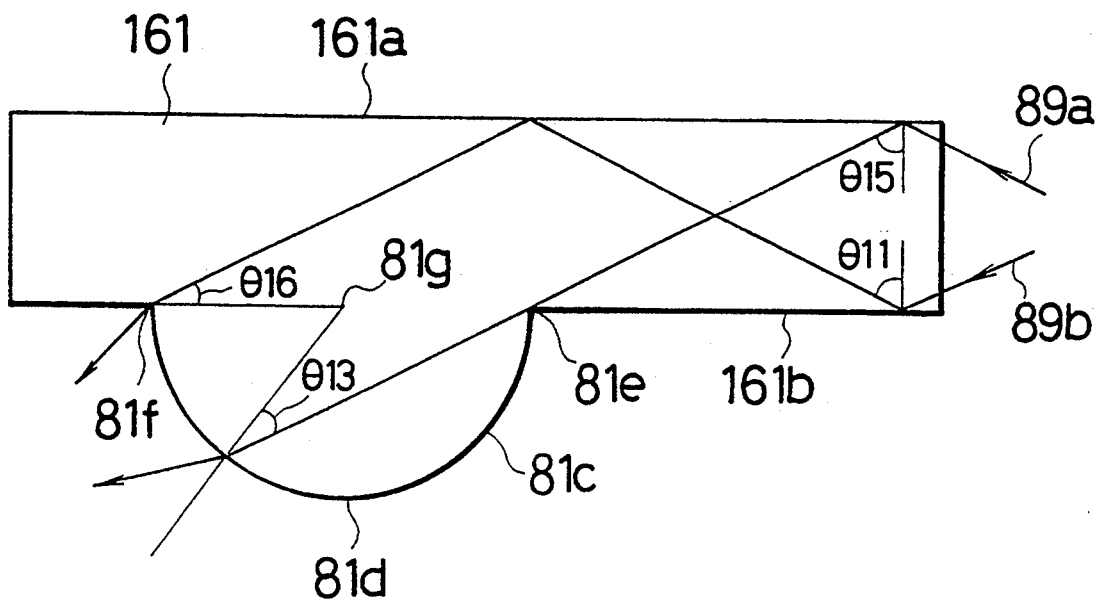
FIG. 13 is a diagram for explaining the other operating principle of the light guide plate 161 provided in the liquid crystal display device 160.

FIG. 13 is a diagram showing other shape of the protrusions 161. Here, easy-to-process hemispherical protrusions 81c are formed. Referring to FIG. 13 hereinafter, the operating principle is explained.

Supposing the incident angles of the illumination lights 89a, 89b entering the light guide plate 161 from the lamps 63a, 63b to the upper surface 161a and lower surface 161b of the light guide plate to be $\theta 15$, $\theta 11$, and the refractive index of the light guide plate 161 to be n, when satisfying the conditions of $$\sin \theta 11 > 1/n \qquad (18)$$

$$\sin \theta 15 > 1/n \qquad (19)$$

the illumination lights 89a, 89b propagate inside of the light guide plate 161 while repeating reflections between the upper surface 161a and lower surface 161b of the light guide plate 161.

When the illumination lights 89a, 89b enter the protrusions 81c formed on the lower surface 161b of the light guide plate 161, the incident angles $\theta 13$, $\theta 16$ of the illumination light 89a passing the right end proximal portion 81e of the protrusions 81c in FIG. 13 and the illumination light 89b passing the left end proximal portion 81f of the protrusions 81c on the surface 81d of the protrusions 81c are as follows.

$$\theta 13 \approx 90° - \theta 15 \qquad (20)$$

$$\theta 16 \approx 90° - \theta 11 \qquad (21)$$

The illumination lights 89a, 89b entering the protrusions 81c pass between the right end proximal portion 81e and left end proximal portion 81f, and the incident angle to the surface 81d of the protrusions 81c becomes smaller than the above $\theta 13$, $\theta 16$. Employing the PMMA as the material for the light guide plate, the refractive index is about 1.5, and therefore when the incident angle to the light guide plate surface is 48° or more, the illumination light is emitted from the protrusions 81c. As a result of limiting the incident angle of the light guide plate 161 by the collimator to be 48° or more, leak of the illumination light from the light guide plate surface was not recognized, and the illumination light was emitted from the lower surface 161b. When the light guide plate 161 was installed in the liquid crystal display element 72, a favorable display quality was obtained.

In this way, the illumination light 69 propagating through the light guide plate 161 may be taken out from the protrusions formed on the light guide plate surface. The shape of the protrusions may be conical, pyramidal, truncated conical or truncated pyramidal as mentioned above. Furthermore, when the sectional shape of the protrusions is nearly semicircular, ellipsoidal, parabolic or arcuate, the light can be taken out. Meanwhile, the shape of the protrusions is not limited to them alone, but the protrusions may be formed in other shapes so far as the light entering the protrusions may not satisfy the conditions of the total reflection.

Figure 14:
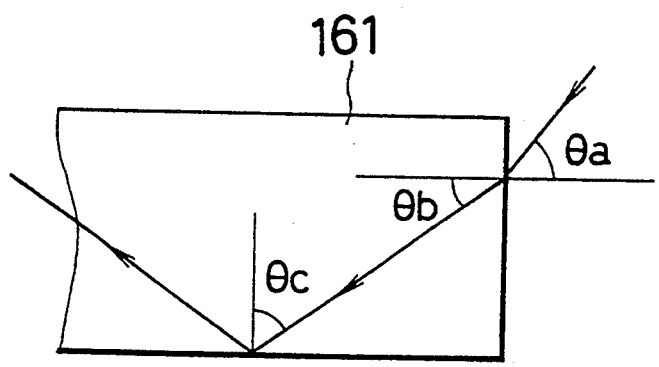
FIG. 14 is a diagram for explaining a different embodiment of the invention.

FIG. 14 is a diagram for explaining other embodiment of the invention. By referring to FIG. 14, first according to the Snell's rule, the relation of $$n \cdot \sin \theta b = \sin \theta a \tag{22}$$

is established. Here, when the light from the external lamps 63a, 63b enters the light guide plate 161, it results in the following relation, $$\sin \theta b < 1/n \tag{23}$$

On the other hand, the condition for total reflection of the incident light on the surface inside the light guide plate 161 is $$\sin \theta c > 1/n \tag{24}$$

Here, the condition is $$\theta b + \theta c = 90° \tag{25}$$

and from formula (23) and formula (24), it follows that $$\sin \theta b < 1/n < \sin (90° - \theta b) \tag{26}$$

The value of $\theta b$ to satisfy the relation of formula (26) is $$\theta b < 45° \tag{27}$$

At this time, the refractive index n is $$n > 1.42 \tag{28}$$

Therefore, when the refractive index n of the light guide plate 161 satisfies formula (28), the collimators 62a, 62b for limiting the incident angle of the incident light to the light guide plate 161 are not necessary. For example, when the PMMA is used as the material for the light guide plate 161, since the refractive index n is 1.5, the collimator for limiting the upper limit of the incident angle of the incident light from the lamps 63a, 63b is not necessary.

Figure 15:
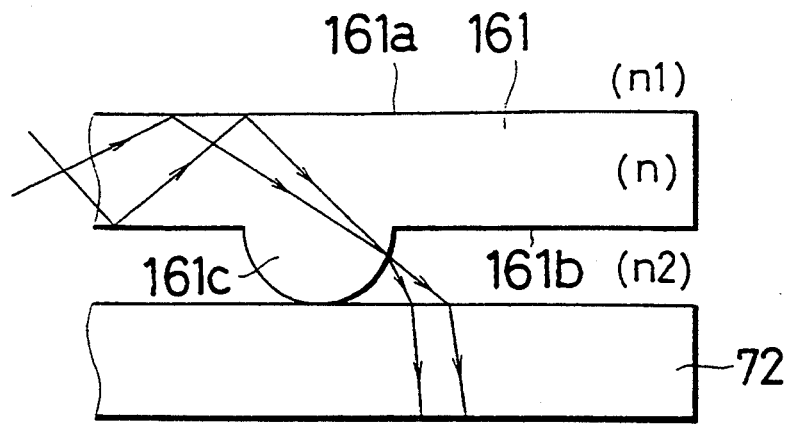
FIGS. 15(1), 15(2), and 15(3) are diagrams for explaining another operating principle of the light guide plate 161 used in the invention.
Figure 15:
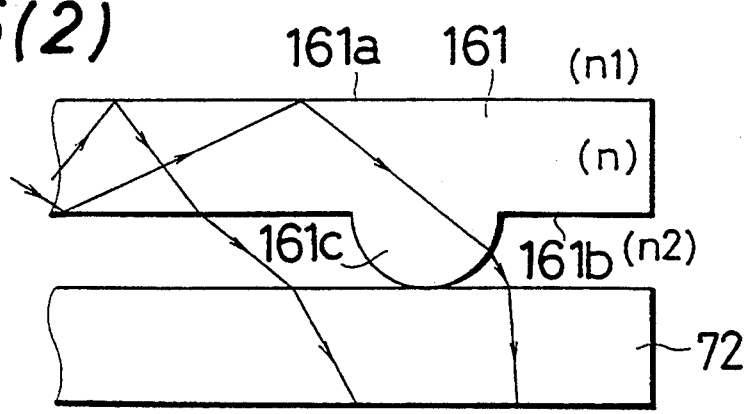
Figure 15:
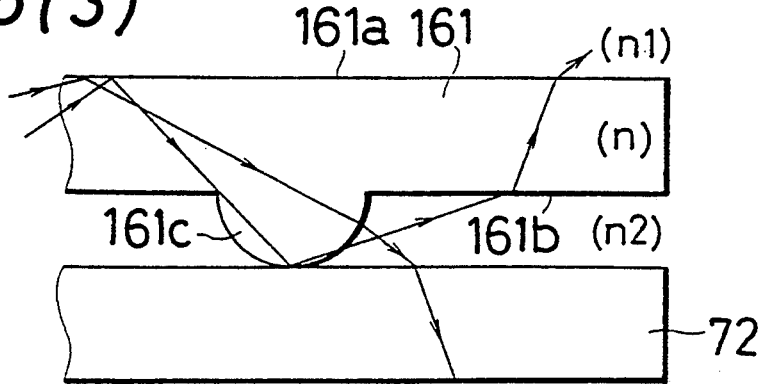

FIG. 15 is a diagram for explaining the other operating principle of the light guide plate 161. Here, the refractive index of the light guide plate 161 is supposed to be n, the refractive index of the substance positioned on the opposite side of the liquid crystal display element 72 of the light guide plate 161 to be n1, and the refractive index of the substance positioned at the side of the liquid crystal display element 72 of the light guide plate 161 to be n2.

FIG. 15 (1) shows the operation in the case of n1=n2. In the lower surface 161b other than the protrusions 161c of the light guide plate 161, the light is reflected, but the light entering the protrusions 161c is not reflected but is emitted to the side of the liquid crystal display element 72.

FIG. 15 (2) shows the operating principle in the case of n1>n2. On the upper surface 161a of the light guide plate 161, the light is totally reflected, but is also emitted to the liquid crystal display element 72 side also from other parts than the protrusions 161c of the lower surface 161c. The light entering the protrusions 161c is totally emitted to the liquid crystal display element 72 side same as in FIG. 15 (1).

FIG. 15 (3) shows the operating principle in the case of the refractive index n2 being sufficiently smaller than the refractive index n of the light guide plate 161. The light leaving the protrusions 161c may sometimes enter again the light guide plate 161. At this time, the re-entering light is emitted from the upper surface 161a to the upper side, that is, to the observer 70 side. Such upward emission of the light is not so much desired, but it does not matter so far as it does not reach the eye of the observer 70 directly.

Figure 16:
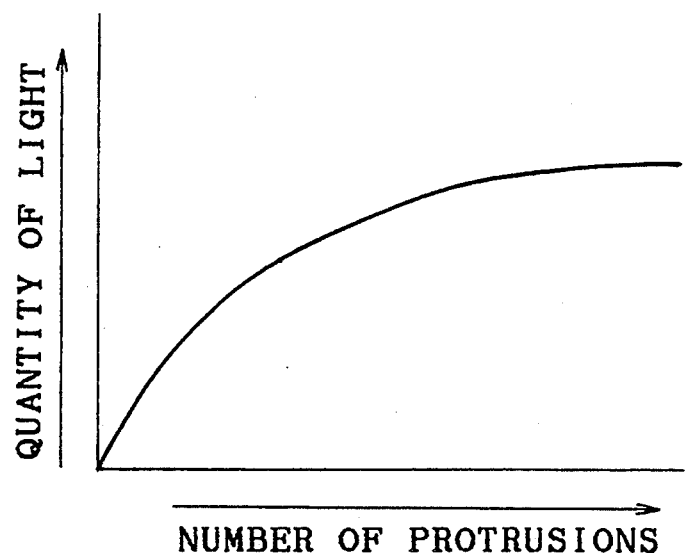
FIG. 16 is a graph showing the relation between the number of protrusions and the quantity of light.

FIG. 16 is a graph showing the relation between the number of protrusions and quantity of light. Depending on the quantity of light of the lamps 63a, 63b, the number of protrusions may be properly selected. By properly varying the size, shape and density of the protrusions within the surface of the light guide plate, the quantity of light taken out of the light guide plate may be made uniform. On the other hand, when the protrusions are disposed on the light guide plate in other positions than the pixels of the liquid crystal display element 72, for example, above the light shielding membrane between pixels, the display is not affected by the protrusions at all, and a more desired display is obtained.

In this embodiment, as the material for the light guide plate, PMMA is used, but other materials, for example, glass, CR-39 resin, polycarbonate, polyvinyl chloride, and polyester may be used as far as the light can be guided uniformly without attenuation and the refractive index is proper.

The light leaving the light guide plate 161 is not reflected by the transparent substrate 65a, and runs straight forward until reaching the reflector plate 68. The light reaching the reflection plane 68a of the reflector plate 68 is scattered by the reflection surface 68a, and made uniform, and passes sequentially the adhesive 67b, polarizer 64b, adhesive 67a, transparent substrate 65b, liquid crystal layer 66, transparent substrate 65a, air layer 71b, light guide plate 161, air layer 71a, and polarizer 64a, and reaches the eye of the observer 70 seeing the display surface. At this time, in order to enhance the uniformity of light, a diffusion plate may be disposed between the reflector plate 68 and transparent substrate 65b.

Thus, according to the embodiment, the light guide plate 161, collimators 62a, 62b, and lamps 63a, 63b for composing the light source device may be disposed at the front side (the observer 70 side) of the liquid crystal display element 72. As a result, if the surrounding is dark in the reflective type liquid crystal display device, the light necessary for display is given to the liquid crystal display element 72 by operating (lighting) the light source, so that a visible display is realized.

Besides, when the surrounding is bright, by putting out the light source device, the light guide plate 161 becomes transparent, and a sufficiently visible display is realized only with external light alone. Thus, by operating the light source device only when necessary, the power consumption may be saved.

Furthermore, since the light guide plate 161 may be disposed between the polarizer 64a and liquid crystal display element 72, the number of times of passing of the light through the polarizer may be decreased by one, so that a brighter display may be realized as compared with the case of disposing the light guide plate 161 outside of the polarizer 64a.

In the embodiment, the confronting lamps 63a, 63b are used, but only one lamp may be enough if a sufficient quantity of light may be obtained.

Furthermore, as compared with the prior art of (a) illumination lamp plate type, a display excellent in uniformity is obtained. Moreover, as compared with the prior art of (f) transparent reflection plate type, a thin lightweight, and bright display excellent in uniformity is obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising:
    a liquid crystal display element composed of a transparent substrate, a counter substrate disposed oppositely to the transparent substrate and possessing reflecting means for reflecting the incident light entering from the transparent substrate side, and a liquid crystal layer interposed therebetween,
    a light guide plate disposed at the transparent substrate side of the liquid crystal display element,
    a light source disposed at the edge of the light guide plate, and
    a collimator disposed between the light guide plate and the light source for controlling the light from the light source,
    wherein the condition of $$n1 < n\cdot\sin\theta < n2 \qquad (1)$$

is satisfied supposing the refractive index of the light guide plate is n, the refractive index of a substance positioned at the side of the light guide plate opposite the liquid crystal display element is n1, the refractive index of a substance positioned at the liquid crystal display element side of the light guide plate is n2, and the incident angle of the light source light transmitted through the collimator to the side of the light guide plate opposite the liquid crystal display element is $\theta$.

2. A liquid crystal display device comprising:
    a liquid crystal display element composed of a transparent substrate, a counter substrate disposed oppositely to the transparent substrate and possessing reflecting means for reflecting the incident light entering from the transparent substrate side, and a liquid crystal layer interposed therebetween,
    a light guide plate disposed at the transparent substrate side of the liquid crystal display element, and
    a light source disposed at the edge of the light guide plate, wherein
    plural protrusions are formed on the surface of the light guide plate at the liquid crystal display element side, and the condition of $$n1 < n\cdot\sin\theta \qquad (2)$$

is satisfied, supposing the refractive index of the light guide plate is n, the refractive index of a substance positioned at the side of the light guide plate opposite the liquid crystal display element is n1, and the incident angle of the light source light to the side of the light guide plate opposite the liquid crystal display element is $\theta$.

3. A liquid crystal display device as claimed in claim 1 or 2, wherein the reflecting means has its reflection surface formed in a smooth undulated surface, and is disposed on the surface of the counter substrate opposite the liquid crystal layer.

4. A liquid crystal display device as claimed in claim 1 or 2, wherein the reflecting means has its reflection surface formed in a smooth undulated surface, and is disposed on the surface of the counter substrate on the side of the liquid crystal layer.

5. A liquid crystal display device as claimed in claim 1 or 2, wherein one polarizer is disposed at the viewer side of the light guide plate.

6. A liquid crystal display device as claimed in claim 5, wherein an air layer with a refractive index n1 (satisfying $n1 < n\cdot\sin\theta$) is interposed between the polarizer and light guide plate.

7. A liquid crystal display device as claimed in claim 5, wherein the surface of the viewer side of the light guide plate is coated with a material with a refractive index n1 (satisfying $n1 < n\cdot\sin\theta$), and the polarizer is directly disposed on its surface.

8. A liquid crystal display device as claimed in claim 5, wherein the polarizer is made of a material with a refractive index n1 (satisfying $n1 < n\cdot\sin\theta$) and is directly disposed on the light guide plate.

9. A liquid crystal display device as claimed in claim 1 or 2, wherein two polarizers are disposed, one polarizer at the viewer side of the light guide plate, and the other between the reflecting means located outside the counter substrate and the counter substrate.

10. A liquid crystal display device as claimed in claim 9, wherein an air layer with a refractive index n1 (satisfying $n1 < n\cdot\sin\theta$) is interposed between the one polarizer and the light guide plate.

11. A liquid crystal display device as claimed in claim 9, wherein the surface of the viewer side of the light guide plate is coated with a material with a refractive index n1 (satisfying $n1 < n\cdot\sin\theta$), and the one polarizer is directly disposed on its surface.

12. A liquid crystal display device as claimed in claim 9, wherein the one polarizer is made of a material with a refractive index n1 (satisfying $n1 < n\cdot\sin\theta$) and is directly disposed on the light guide plate.

13. A liquid crystal display device as claimed in claim 1 or 2, wherein a diffusion plate is disposed at the viewer side of the reflecting means.

14. A liquid crystal display device as claimed in claim 1 or 2, wherein a reflector for preventing light leak from the light guide plate is disposed at the edge of the light guide plate not provided with the light source.

15. A liquid crystal display device as claimed in claim 1 or 2, wherein the light source is lit when the surrounding light alone provides an insufficient quantity of light.

16. A liquid crystal display device as claimed in claim 2, wherein the protrusions are in a conical form.

17. A liquid crystal display device as claimed in claim 2, wherein the protrusions are in a pyramidal form.

18. A liquid crystal display device as claimed in claim 2, wherein the protrusions are in a truncated conical form.

19. A liquid crystal display device as claimed in claim 2, wherein the protrusions are in a truncated pyramidal form.

20. A liquid crystal display device as claimed in claim 2, wherein the sectional shape of the protrusions is nearly semicircular.

21. A liquid crystal display device as claimed in claim 2, wherein the sectional shape of the protrusions is ellipsoidal.

22. A liquid crystal display device as claimed in claim 2, wherein the sectional shape of the protrusions is parabolic.

23. A liquid crystal display device as claimed in claim 2, wherein the sectional shape of the protrusions is arcuate.

24. A liquid crystal display device as claimed in claim 2, wherein the protrusions are identical in shape but differ in size.

25. A liquid crystal display device as claimed in claim 2, wherein the protrusions have plural different shapes.

26. A liquid crystal display device as claimed in claim 2, wherein the array density of the protrusions increases continuously or in steps, in proportion to the distance from the light source.

27. A liquid crystal display device as claimed in claim 2, wherein the size of the protrusions increases, either continuously or in steps, in proportion to the distance from the light source.

28. A liquid crystal display device as claimed in claim 2, wherein the protrusions are disposed in regions other than the pixels of the liquid crystal display element.

29. A liquid crystal display device as claimed in claim 1, wherein the liquid crystal display element side surface of the light guide plate is coated with a film made of a light transmitting material with a refractive index which is lower than that of the light guide plate, and the film thickness of the coating film is decreased, either continuously or in steps, in inverse proportion to the distance from the light source.

* * * * *